United States Patent
Saga et al.

(10) Patent No.: US 6,529,466 B2
(45) Date of Patent: Mar. 4, 2003

(54) INFORMATION RECORDING APPARATUS

(75) Inventors: Hideki Saga, Kokubunji (JP); Hirofumi Sukeda, Tokorozawa (JP); Takehiko Yorozu, Toride (JP)

(73) Assignees: Hitachi, Ltd., Tokyo (JP); Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 10/020,211

(22) Filed: Dec. 18, 2001

(65) Prior Publication Data

US 2002/0041553 A1 Apr. 11, 2002

Related U.S. Application Data

(62) Division of application No. 09/712,976, filed on Nov. 16, 2000, which is a division of application No. 09/572,379, filed on May 18, 2000, now Pat. No. 6,188,658, which is a division of application No. 08/996,096, filed on Dec. 22, 1997, now Pat. No. 6,104,685.

(30) Foreign Application Priority Data

Dec. 26, 1996 (JP) .............................. 8-347143

(51) Int. Cl.⁷ ............................................. G11B 7/00
(52) U.S. Cl. .................... 369/116; 369/59.11; 369/47.5; 369/53.27
(58) Field of Search .......................... 369/47.1, 47.49, 369/47.51, 53.1, 53.26, 59.1, 59.11, 59.12, 116, 53.27

(56) References Cited

U.S. PATENT DOCUMENTS

| | | | |
|---|---|---|---|
| 4,894,816 A | 1/1990 | Sukeda et al. | |
| 5,412,626 A | 5/1995 | Ohno et al. | |
| 5,477,512 A | 12/1995 | Kubo et al. | 369/58 |
| 5,602,819 A | * 2/1997 | Inagaki et al. | 369/109.02 |
| 5,636,194 A | 6/1997 | Furumiya et al. | 369/116 |
| 5,642,343 A | 6/1997 | Toda et al. | |
| 5,732,062 A | 3/1998 | Yokoi et al. | 369/116 |
| 5,815,477 A | 9/1998 | Kimura et al. | 369/116 |
| 6,018,508 A | 1/2000 | Hasegawa | 369/59 |

FOREIGN PATENT DOCUMENTS

| | | |
|---|---|---|
| DE | 3804240 | 8/1988 |
| EP | 0713213 | 5/1996 |
| JP | 1-78437 | 3/1989 |
| JP | 4-265522 | 9/1992 |
| JP | 5-143993 | 6/1993 |
| JP | 5-298737 | 11/1993 |

* cited by examiner

Primary Examiner—Muhammad Edun
(74) Attorney, Agent, or Firm—Antonelli, Terry, Stout & Kraus, LLP

(57) ABSTRACT

An information recording apparatus for recording data by applying energy to a recording medium to form thereon local physical changes of the medium includes a total energy irradiating amount discriminating unit for discriminating a total energy irradiating amount of each mark and each space when data is recorded, and a recording energy irradiating unit for switching between at least two levels of the total energy irradiating amount during a mark non-forming period, in accordance with results discriminated by the total energy irradiating amount discriminating unit. The at least two levels may be at least two mutually different levels.

4 Claims, 6 Drawing Sheets

(a) MANNER 1 OF CHANGING WAVEFORM (b) MANNER 2 OF CHANGING WAVEFORM

INFORMATION RECORDING APPARATUS

CROSS REFERENCE TO RELATED APPLICATIONS

This application is a division of application Ser. No. 09/712,976 filed on Nov. 16, 2000, now U.S. Pat. No. 6,430,132, which is a division of application Ser. No. 09/572,379 filed on May 18, 2000, now U.S. Pat. No. 6,188,658, which is a division of application Ser. No. 08/996,096 filed on Dec. 22, 1997, now U.S. Pat. No. 6,104,685. The contents of application Ser. Nos. 09/712,976, 09/572,379, and 08/996,096 are incorporated herein by reference in their entirety.

This application is related to application Ser. No. 09/712,985 filed on Nov. 16, 2000, now U.S. Pat. No. 6,404,716, which, like parent application Ser. No. 09/712,976 of the present application, is a division of grandparent application Ser. No. 09/572,379 of the present application.

This application is related to application Ser. No. 10/020,210 filed on Dec. 18, 2001, which, like the present application, is a division of parent application Ser. No. 09/712,976 of the present application.

BACKGROUND OF THE INVENTION

1. Field of the Invention

The present invention relates to an information recording apparatus, particularly an optical disk drive, which records data by applying energy to a recording medium to form thereon local physical changes of the medium.

2. Description of the Related Art

Optical disks currently prevailed are roughly divided into magneto-optical disks and phase change disks. In the case of magneto-optical disks, a mark of an inverted magnetic domain is formed on a recording film by heating the film, and in the case of phase change disks, a mark of an amorphous region is formed on a recording film by changing a cooling speed of the film under the control of an energy amount when it is heated. In order to increase a recording density of such optical disks, the size of a data carrying mark is reduced, or each change unit of the mark length and space length is made short to narrow a time interval between mark edge detections. In each of these methods, it is essential to form a mark at a high precision. It is very difficult, however, to stably and highly precisely form a fine mark about a half of a light spot diameter. This is because a fine mark is required to be formed on a recording film at an area having a gentle spatial temperature gradient of the film whose temperature is raised by a light spot, particularly at an area having the gentle spatial peak temperature gradient. If an effective recording sensitivity of a recording film varies, because of a change in the peak temperature at each mark caused by a change in a recording film temperature before application of recording energy or by a change in the recording energy intensity, the mark shape is deformed greatly. In the case of an optical disk of the type that the mark shape is controlled by a recording waveform, a peak temperature of a recording film is likely to fluctuate depending upon a recording pattern. A shortest approach to solving this problem is to use a light source of short wavelength laser to reduce the light spot diameter. However, wave-lengths of current semiconductor laser diodes as typical laser light sources are still unsatisfactory in order to meet the requirements of increasing a recording density.

It is therefore necessary to select a recording waveform hard to pose such problems, in order to reliably form a fine mark and perform highly reliable recording/reproducing. The problems associated with a recording waveform to be solved are the following two problems. The first problem is related to suppression of thermal crosstalk to uniformly form nearby marks independently. from the interval therebetween. The second problem is related to a constant heat accumulation to uniformly form consecutive marks independently from their lengths. If the thermal crosstalk suppression and constant heat accumulation can be realized, edge shifts of a reproduction signal can be suppressed so that a mark edge recording method suitable for high linear recording density can be adopted. If constant heat accumulation can be realized, reproduced crosstalk can be made constant so that the track interval can be shortened and the recording area density can be improved.

In a first conventional technique of solving the above problems disclosed in JP-A-5-298737, the recording waveform corresponding to a mark forming period is constituted of a series of pulse trains corresponding to the lengths of marks in a channel data sequence. The number of pulses and the width of pulses are controlled in accordance with the lengths of marks in the channel data sequence. The recording waveform corresponding to the mark forming period is divided into two portions, a front portion and a succeeding portion, and generally the height of each pulse is different. In a mark non-forming period of the recording waveform, a space portion is provided before an auxiliary recording pulse which is generated during this period. The mark forming period reflects the length of a mark in the channel data sequence, and is defined as shown in FIG. 4 at (c) as a period from the first pulse leading edge to the last pulse trailing edge, the pulse having an energy level sufficient for supplying energy of recording a mark, i.e., the pulse having such an energy level as a mark cannot be formed without this level. The mark non-forming period reflects the length of a space in the channel data sequence, and is defined as a period other than the mark forming period. The above definitions are applied also to the following description of this specification. The first conventional technique with the above-described structure holds the position that thermal diffusion directly from the preceding mark formed portion to the immediately succeeding mark leading edge can be compensated independently from the space length, and that the mark width and mark edge position can be controlled at high precision.

In a second conventional technique of solving the above problems disclosed in JP-A-1-078437, with reference to the length of a preceding mark non-forming period, a portion of the recording waveform corresponding to the immediately succeeding mark forming period is made variable. Specifically, as illustrated in FIG. 4 at (a), a recording energy irradiating means is provided which with reference to the lengths of preceding spaces 401 and 403, the recording waveforms corresponding to marks 402 and 404 are controlled, or more precisely, the leading edge forming positions of the marks 402 and 404 are controlled. This second conventional technique holds the position that thermal diffusion directly from the preceding mark formed portion to the immediately succeeding mark leading edge can be compensated independently from the space length, and that the mark width and mark edge position can be controlled at high precision.

Another conventional technique disclosed in JP-A-5-143993 describes that if the blanking period between an immediately preceding light pulse and a current light pulse is short, heat generated by the immediately preceding light pulse influences the current light pulse and therefore this preheat effects are made to have the same effects as the long blanking period, and that the energy level and width of a light pulse supplied from a bias light irradiating unit provided immediately before the current light pulse are determined in accordance with the measured pulse width of the preceding light pulse and the measured blanking period.

Regarding the first problem, although each of the conventional techniques changes the conditions of forming a leading edge of a succeeding mark, this condition change is not satisfactory. Furthermore, each of the conventional techniques does not take into consideration the compensation for the thermal diffusion near to the leading edge forming position of an immediately succeeding mark in accordance with the level of the energy amount used for the formation of the preceding mark. Therefore, only if the preceding mark forming periods are constant, the succeeding mark can be reliably formed irrespective of the length of the mark non-forming period between two marks. However, if the immediately preceding mark forming period changes, it is difficult to form the leading edge of a succeeding mark at a target position even if the mark non-forming period between two marks is constant. Namely, the longer the preceding mark forming period, the more the heat energy used for the formation of the preceding mark diffuses near to the leading edge forming position of the immediately succeeding mark, and the nearer the leading edge comes to the trailing edge of the immediately preceding mark. The above phenomena become more conspicuous as the linear recording density is raised or the mark non-forming period between two marks becomes short.

Regarding the second problem, each of the conventional techniques is unsatisfactory with respect to the constant heat accumulation, and cannot suppress sufficiently a shift of the trailing edge from a target position depending upon the mark width, if the mark width is shortened and the linear recording density is raised. Namely, the trailing edge position and mark width fluctuate depending upon the distance from the mark leading edge. The above phenomena become conspicuous as the linear recording density is raised.

From the above reasons, therefore, each of the above conventional techniques cannot form a fine mark at a sufficiently high precision and therefore cannot realize a sufficient recording area density.

SUMMARY OF THE INVENTION

In order to solve the first problem, the invention provides an information recording apparatus for recording data by applying energy to a recording medium to form thereon local physical changes of the medium, the information recording apparatus comprising: recording energy irradiating means for generating at least two recording waveforms when marks or spaces of the same length in a channel data sequence are recorded.

In order to solve the first problem, the invention further provides an information recording apparatus for recording data by applying energy to a recording medium to form thereon local physical changes of the medium, the information recording apparatus comprising: recording pattern analyzing means for analyzing a recording pattern in a channel data sequence when data is recorded; and recording energy irradiating means for generating at least two recording waveforms when marks or spaces of the same length in the channel data sequence are recorded, in accordance with the analyzed results by said recording pattern analyzing means.

The recording pattern includes information on the lengths of marks and spaces, the sequential orders of marks and patterns and other information. The recording waveform indicates how a recording energy is applied to a recording medium, i.e., a time sequential change in a recording energy level.

As described above, the conditions of forming the leading edge of a succeeding mark are precisely compensated with respect to the space length immediately after the preceding mark. Furthermore, thermal diffusion near to the leading edge forming position of an immediately succeeding mark is compensated depending upon the energy amount used for forming the immediately preceding mark. In the above manner, a mark can be formed reliably independently from the length of the immediately preceding mark and the length of a space between two marks.

In order to solve the second problem, the invention provides an information recording apparatus for recording data by applying energy to a recording medium to form thereon local physical changes of the medium, the information recording apparatus comprising: recording energy irradiating means for generating a recording waveform during a mark forming period, the upper and lower envelopes of the recording waveform lowering as a time lapses from the start of the mark forming period.

As above, heat accumulation when a long mark is formed can be compensated precisely, and the trailing edge of a long mark can be formed precisely at a target position independently from the mark length.

DETAILED DESCRIPTION OF THE PREFERRED EMBODIMENTS

Figure 8:
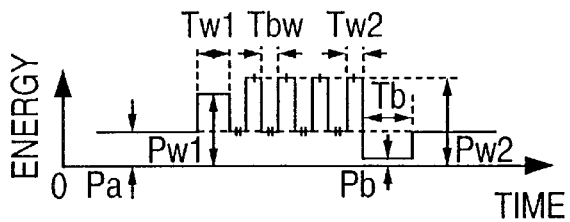
FIG. 8 is a diagram illustrating different configurations of recording waveforms.
Figure 8:
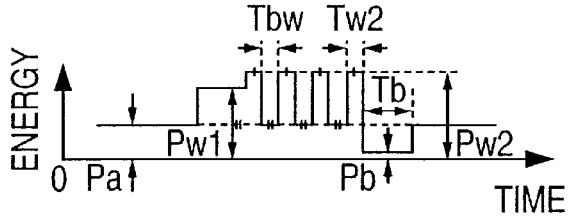

Embodiments of the invention will be described. In the embodiments, a magneto-optical recording medium will be described as an example of a recording medium. The recording medium is not limited only thereto, but the techniques disclosed in the embodiments are shared by other recording media so long as they are of the type that data is recorded by applying energy to the recording medium to form local physical changes thereon. Also in the embodiments, although a recording waveform which changes only a single parameter will be described, the configuration of a recording waveform of this invention is not limited thereto. For example, although a recording waveform shown in FIG. 8 at (a) can be definitely identified by designating parameters Pa, Pb, Pw1, Pw2, Tb, Tw1, Tw2 and Tbw, a different configuration of a recording waveform with its parameters being all different may also be used. A changing portion of a recording waveform may be a mark forming area, a mark non-forming area, or both areas. Parameters identifying a recording waveform are illustrative and are not limited thereto, but other configurations of a recording waveform identified with parameters different from the embodiments may also be used. Configurations of waveforms unable to be identified by common parameters such as shown in FIG. 8 at (a) and (b) may also be used.

The level of recording energy means an average energy level during a period longer than a thermal relaxation time of a recording film of a recording medium. If the frequency components sufficiently higher than that corresponding to a period of a channel bit length (a change unit of edge positions of mark and space) are superposed upon a recording waveform from any reasons, the recording energy level means an average energy level during a period longer than that which can neglect the influence of the frequency components.

Figure 1:
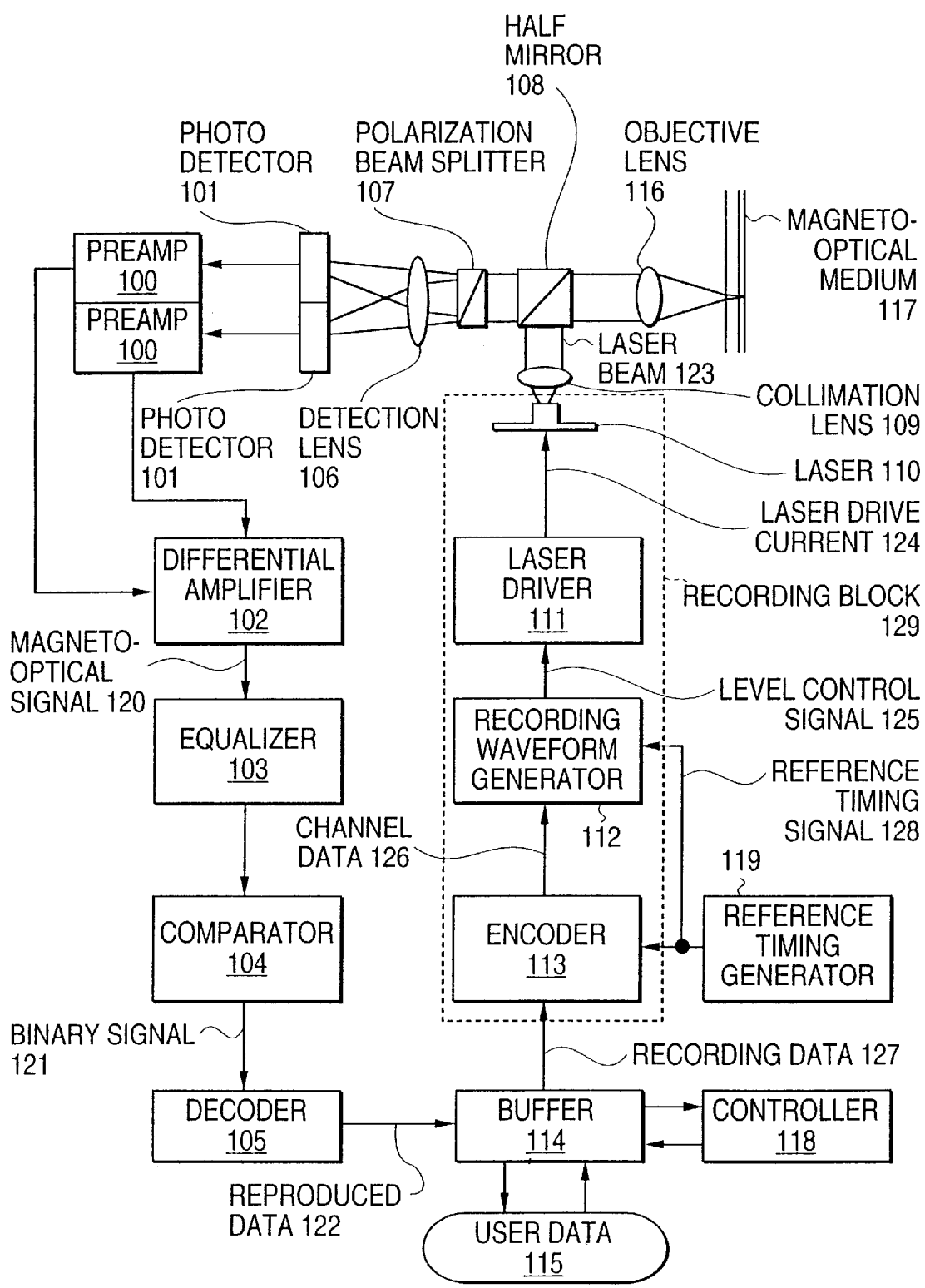
FIG. 1 is a diagram illustrating the structure of a disk drive of this invention.

FIG. 1 is a diagram showing an example of the structure of an information recording apparatus of this invention. User data 115 to be recorded is temporarily stored in a buffer 114 by a predetermined amount under the control of a controller 118. Recording data 127 supplied from the buffer 114 is converted into a channel data sequence 126 by an encoder 113, the channel data sequence corresponding to the positions of marks (not shown) to be formed on a magneto-optical medium 117. The channel data sequence 126 is supplied to a recording waveform generator 112 whereat it is converted into level control signals 125 corresponding to the recording waveform. The encoder 113 and recording waveform generator 112 operate synchronously with a reference timing signal 128 generated by a reference timing generator 119. A laser driver 111 generates a laser drive current 124 in accordance with the level control signals 125 to make a laser 110, as a recording energy source, emit light in accordance with the recording waveform. A laser light 123 radiated from the laser 110 passes through a half mirror 108 and an objective lens 116 and is converged onto the magneto-optical recording medium 117 to heat its recording film (not shown) and form a mark. In reproducing data, a mark sequence on the magneto-optical recording medium 117 is scanned with a laser beam 123 having a low level to the extent that is does not destruct a mark. Light reflected from the magneto-optical recording medium 117 passes through the objective lens 116 and half mirror 108 and is incident upon a polarization beam splitter 107 which splits the reflected light, whose polarizing surface rotates in a reverse direction in accordance with the mark magnetization direction, into orthogonal polarization light beams each being directed via a detection lens 106 to a photo detector 101. The photo detectors 101 convert the orthogonal polarization light beams into electrical signals proportional to the intensities of the light beams. Each electrical signal is amplified by a pre-amplifier 102 of each photo detector 101 to a sufficient amplitude, and thereafter supplied to a differential amplifier 102. The differential amplifier 102 amplifies a difference between input signals and generates a magneto-optical signal 120 corresponding to a presence/absence of a mark at the scanned position of the magneto-optical recording medium 117. The magneto-optical signal 120 undergoes a wave equalizing process at an equalizer and is converted into a binary signal by a comparator 104. A decoder 105 performs an inverse modulation of the encoder 113 to convert the binary signal 121 into reproduced data which is stored in the buffer 114 by a predetermined amount under the control of the controller 118 and output from the apparatus as user data 115.

Figure 2:
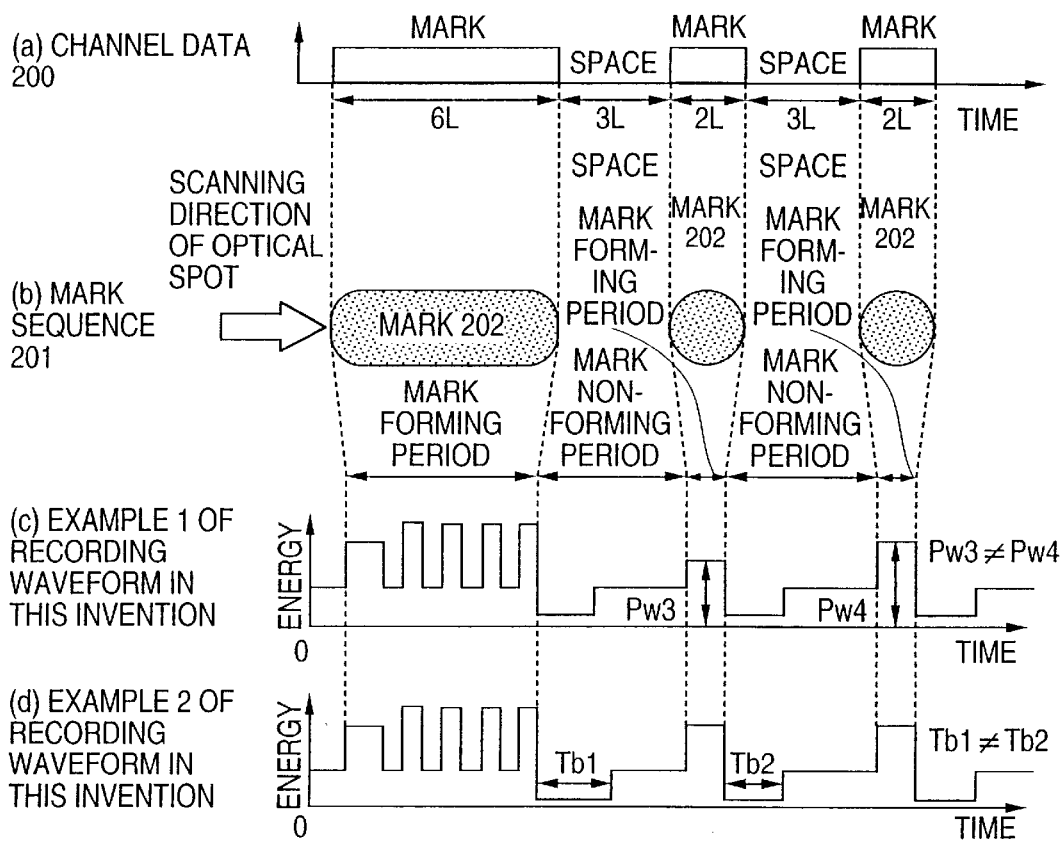
FIG. 2 is a diagram illustrating recording waveforms of the invention.

FIG. 2 at (a) to (d) is a diagram showing marks and spaces of a channel data sequence and corresponding recording waveforms of this invention. FIG. 2 at (a) shows a channel data sequence generated from recording data by the encoder. FIG. 2 at (b) shows an image of a mark sequence on a recording medium. A recording/reproducing laser light spot is scanned from the left to right in FIG. 2 at (b). Each mark 202 is one-to-one correspondence with each mark of the channel data sequence 200, and has a length corresponding to the duration of each mark of the channel data sequence 200. FIG. 2 at (c) shows an example of a recording waveform of the invention corresponding to the channel data sequence 200 shown in FIG. 2 at (a). This recording waveform has two different configurations for the record of two marks having the same length of 2L. FIG. 2 at (d) shows another example of a recording waveform of the invention corresponding to the channel data sequence 200 shown in FIG. 2 at (a). This recording waveform has two different configurations for the record of spaces having the same length of 3L. A length L is a minimum unit of a change amount of a mark/space length of the channel data sequence 200.

Figure 3:
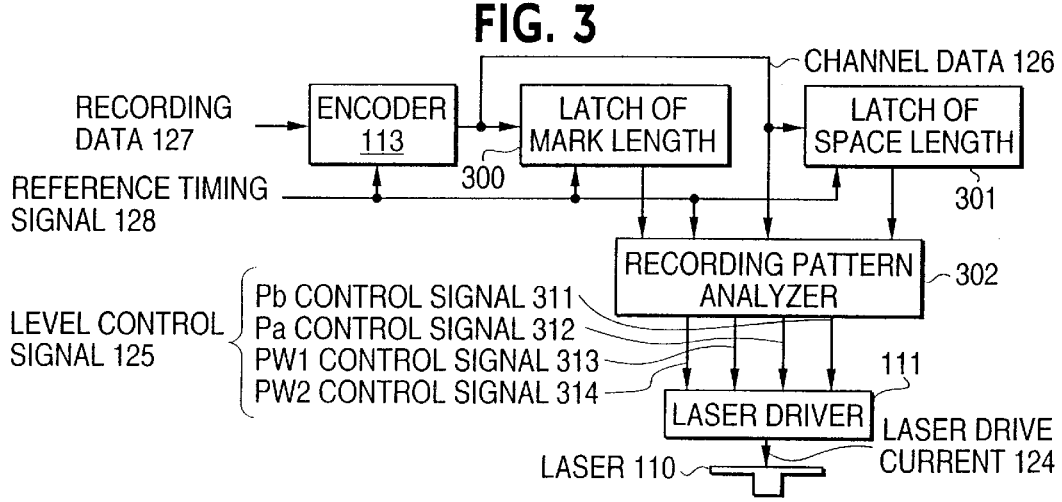
FIG. 3 is a diagram showing the structure of a recording block of the disk drive of the invention.

FIG. 3 is a detailed diagram showing an example of the structure of a recording block 129 shown in FIG. 1. The encoder 113 converts the recording data 127 into the channel data sequence 126 in accordance with a pre-determined modulation rule. The channel data sequence 126 is input to a recording pattern analyzer 302, a mark length latch 300 and a space length latch 301. The mark length latch 300 holds a length of each mark in the channel data sequence 126 for a predetermined period in a FIFO manner, whereas the space length latch 301 holds a length of each space in the channel data sequence 126 for a predetermined period in a FIFO manner. The mark length and space length held by the latches are input to a recording pattern analyzer 302. With reference to the channel data sequence 126 supplied from the encoder 113 and the data in the mark length latch 300 and space length latch 301 which data is information of a preceding recording pattern, the recording pattern analyzer 302 generates a Pb control signal 311, a Pa control signal 312, a Pw1 control signal 313 and a Pw2 control signal 314 corresponding to an actual recording waveform, in a manner adaptative to the preceding recording pattern. With reference to these level control signals 125, the laser driver 111 synthesizes the laser drive current 124 and drives the laser 110 as the recording energy source. The encoder 113, recording pattern analyzer 302, mark length latch 300 and space length latch 301 operate synchronously with the reference timing signal 128 to transfer and generate various signals.

The channel data sequence output from the encoder is now classified into each pair of mark and space, to represent the length of an n-th (n is a natural number) mark by M(n) and the length of an n-th space by S(n). The mark length latch 300 holds the immediately preceding mark length M(n) until the immediately succeeding (n+1)-th mark is completely recorded, whereas the space length latch 301 holds the immediately preceding space length S(n) until the immediately succeeding (n+1)-th space is completely recorded. For example, while the information recording apparatus records the (n+1)-th mark after the n-th space, the mark length latch 300 holds the n-th mark length M(n) and supplies it to the recording pattern analyzer 302 until the information recording apparatus completely records the (n+1)-th mark. With reference to the channel data sequence 126 and the value M(n), the recording pattern analyzer 302 controls the level control signal 125. For example, in the case of the recording waveform shown in FIG. 2 at (c), if M(n) is 3L or longer, the recording pattern analyzer 302 controls the level control signal 125 so that the energy level of the start pulse for the record of the (n+1)-th mark (during the mark forming period) becomes Pw3, whereas if M(n) is shorter than 3L, the recording pattern analyzer 302 controls the level control signal 125 so that the energy level of the start pulse for the record of the (n+1)-th mark becomes Pw4. In this case, the values of Pw3 and Pw4 are assumed to be different. In another example, while the information recording apparatus records the n-th space after the n-th mark, the mark length latch 300 holds the n-th mark length M(n) and supplies it to the recording pattern analyzer 302 until the information recording apparatus completely records the n-th space. With reference to the channel data sequence 126 and the value M(n), the recording pattern analyzer 302 controls the level control signal 125. For example, in the case of the recording waveform shown in FIG. 2 at (d), if M(n) is 3L or longer, the recording pattern analyzer 302 controls the level control signal 125 so that the energy level of a low level period provided at the start for the record of the n-th space (during the mark non-forming period) becomes Tb1, whereas if M(n) is shorter than 3L, the recording pattern analyzer 302 controls the level control signal 125 so that the energy level of a low level period provided at the start for the record of the n-th space becomes Tb2. In this case, the values of Tb1 and Tb2 are assumed to be different. In the above operation examples, the recording pattern analyzer 302 refers only to the immediately preceding mark length or space length as the information of the preceding recording pattern. However, this arrangement does not limit the structure and operation of the mark length latch and space length latch, but two or more mark lengths and space lengths may be used.

Figure 9:
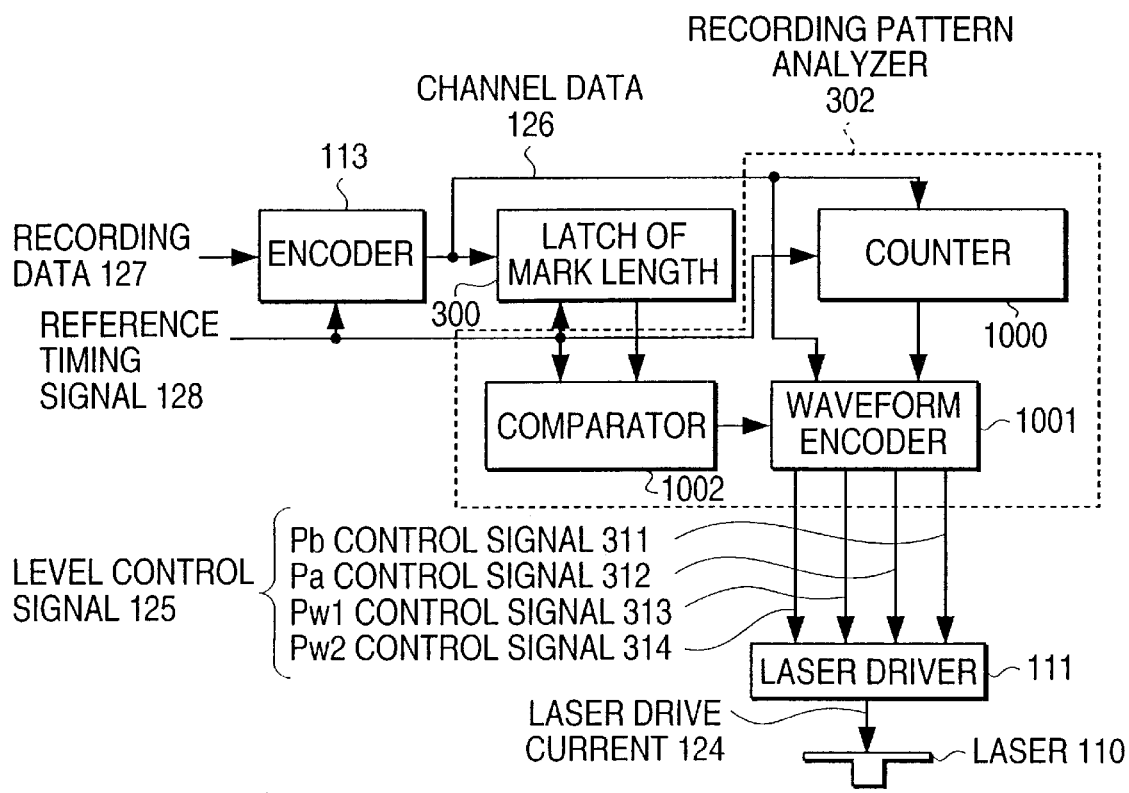
FIG. 9 is a diagram showing the structure of a recording pattern analyzer of an information recording apparatus of this invention.

FIG. 9 is the detailed diagram showing an example of the structure of the recording pattern analyzer 302 shown in FIG. 3. In this example, it is assumed that recording data is (1,7) RLL modulated and thereafter mark edge recorded and that the recording waveform shown in FIG. 2 at (d) is generated. First, the recording data 127 is (1,7) RLL modulated and thereafter NRZI modulated to be converted into a channel data sequence 126. Next, the channel data sequence 126 is input to a mark length latch 300 and a counter 1000. The mark length latch 300 holds the length of each mark in the channel data sequence 126 until the start of the next mark forming period, and supplies it to a comparator 1002. The comparator 1002 compares the mark length with 2L which is the shortest mark length used by the encoder 113, and judges whether the mark length is 2L or whether it is 3L or longer. This judgement result is transferred to a waveform encoder 1001. With reference to a reference timing signal 128 which is a clock signal having a period L, the counter 1000 measures a lapse time from the start edge of a mark or space in the channel data sequence 126 in the unit of L, and supplies the time count result to the waveform encoder 1001. With reference to the channel data sequence 126, the time count result from the counter 1000 and an output from the comparator 1002, the waveform encoder 1001 exclusively generates a Pb control signal 311, a Pa control signal 312, a Pw1 control signal 313 and a Pw2 control signal 314 corresponding to the recording waveform shown in FIG. 2 at (d). These level control signals 125 are generated adaptatively to the preceding recording pattern. Specifically in this example, the period while the Pb control signal 311 is generated at the start of the mark non-forming period is Tb2 if the length of the immediately preceding mark in the channel data sequence 126 is determined from the comparison result by the comparator to be shortest 2L, whereas it is Tb1 if the length is determined to be 3L or longer. Tb1 and Tb2 are not dependent on the length of each space in the channel data sequence 126, but have a relationship Tb1>Tb2. In this example, therefore, a space length latch is not specifically required. During the other period, in accordance with the lapse time from the leading edge of a mark or space in the channel data sequence 126, the level control signals 125 having a predetermined pattern are sequentially output from the waveform encoder 1001. With reference to these level control signals 125, the laser driver 111 synthesizes a laser drive current 124 and drives the laser 110 as the recording energy source. The whole circuit operates synchronously with the reference timing signal 128 to transfer and generate various signals.

Figure 10:
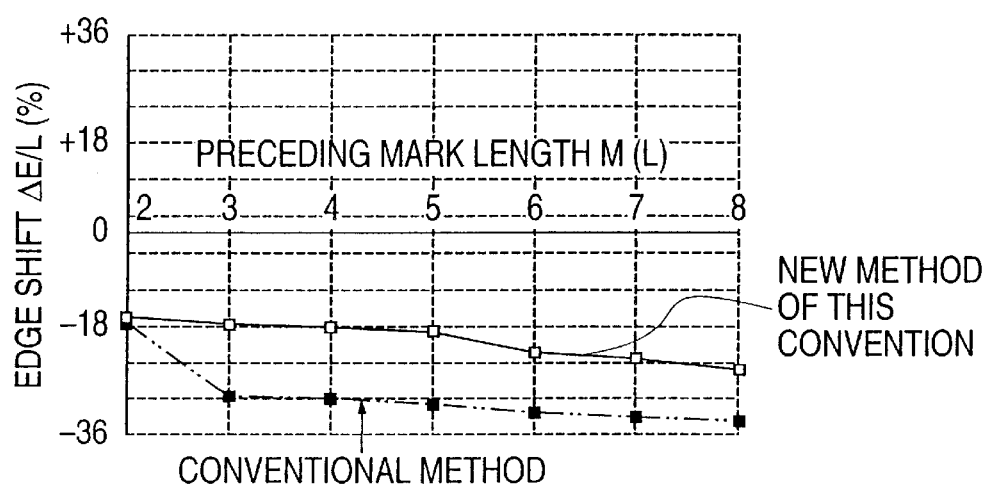
FIG. 10 is a diagram illustrating the operation principle and effects of the information recording apparatus of the invention.

FIG. 10 is a diagram illustrating the effects of the recording pattern analyzer of this invention shown in FIG. 9. This graph shows an example of measurement results of mark edge positions of a signal reproduced from a mark edge recorded magneto-optical recording medium. A solid symbolled curve corresponds to a conventional apparatus, and an open symbolled curve corresponds to the apparatus of this invention. A change in the shape of a succeeding mark relative to a preceding mark length was measured by fixing the interval between two marks. The mark interval and the succeeding mark length were set to 2L which was the shortest length of the modulation rule used by the encoder 113, and the preceding mark length was changed in the range from 2L to 8L. A light spot diameter was about 1.2 $\mu$m and a detection window width L was 0.27 $\mu$m. $\Delta$E is a shift of a succeeding mark leading edge from an ideal position, the sign of a shift amount being set positive in the delay direction. The shift amount was plotted as a percentage of $\Delta$E in the detection window width L. In the case of a conventional apparatus, as the preceding mark becomes long, the leading edge gradually shifts. The leading edge shifts greatly if the preceding mark is 3L or longer, as compared to the preceding mark of 2L. In other words, if the preceding mark is 3L or longer, the succeeding mark is formed considerably large as compared to the preceding mark of 2L. If ideal marks can be formed, the edge shifts become constant independent from the preceding mark lengths. If the edge shifts are constant, this shift can be removed through signal processing. However, if the edge shifts change with the preceding mark lengths, it is difficult to remove them. Therefore, in order to achieve stable data recording/reproducing, it is preferable to make the edge shifts generally constant independently from the preceding mark lengths. In a conventional apparatus, a constant heat compensation period (Pb level period shown in FIG. 2 at (d)) for stopping heating immediately after the mark forming period is always provided to compensate for thermal interference corresponding to the preceding space length, i.e., position related thermal interference. Namely, this constant heat compensation period has been expected to make the edge shifts generally constant independently from either a preceding mark length or a preceding space length. The reason for this is as follows. The heat conduction effect from the preceding mark and the effect of the preheat period (Pa level period shown in FIG. 2 at (d)) during the mark non-forming period are balanced and the total effects become generally constant so that the immediately succeeding mark can be formed stably. With a conventional apparatus, however, compensation for an input heat amount of a preceding mark, i.e., compensation for a magnitude of heat source, was not performed. The above-described problem occurs therefore if a linear recording density is raised and a change in heat conduction from the preceding mark to the succeeding mark cannot be neglected.

As above, a conventional apparatus has a limit in high linear density recording. It can be understood from detailed studies of the solid symbolled curve shown in FIG. 10 that there is a large difference of the edge shift between the shortest preceding mark length 2L and the mark length 3L or longer. This means that heat conduction to the succeeding mark becomes different depending upon whether the preceding mark has a portion longer than 2L from the trailing edge thereof toward the upstream direction (opposite to the light spot scanning direction), i.e., whether the preceding mark length is shortest 2L. Namely, the space of the succeeding mark becomes different depending upon whether there is heat conduction from the portion longer than 2L from the trailing edge of the preceding mark toward the upstream direction to the succeeding mark. In order to form a succeeding mark reliably, the conditions of forming a succeeding mark is required to be changed adaptatively to whether or not the preceding mark has the shortest mark length. The recording waveform shown in FIG. 2 at (d) is generated by the recording pattern analyzer shown in FIG. 9 by changing the conditions of forming a succeeding mark adaptatively to the preceding mark length. Several methods are conceivable as the method of changing the conditions of forming a succeeding mark. The recording waveform shown in FIG. 2 at (d) is generated by the recording pattern analyzer shown in FIG. 9 by changing the heat compensation period. Specifically, if the preceding mark length is 3L or longer and excessive heat conduction to the succeeding mark is probable, the heat shielding period is prolonged to reduce a preheat amount. Therefore, as seen from the white plotted curve of FIG. 10, the edge positions of succeeding marks are stable independently from the preceding mark lengths, and nearly ideal marks can be formed. In this example, although the duration of the heat shielding period is changed as a method of changing the conditions of forming a succeeding mark, other methods may be used such as changing the recording waveform of a succeeding mark itself as shown in FIG. 2 at (c).

Figure 4:
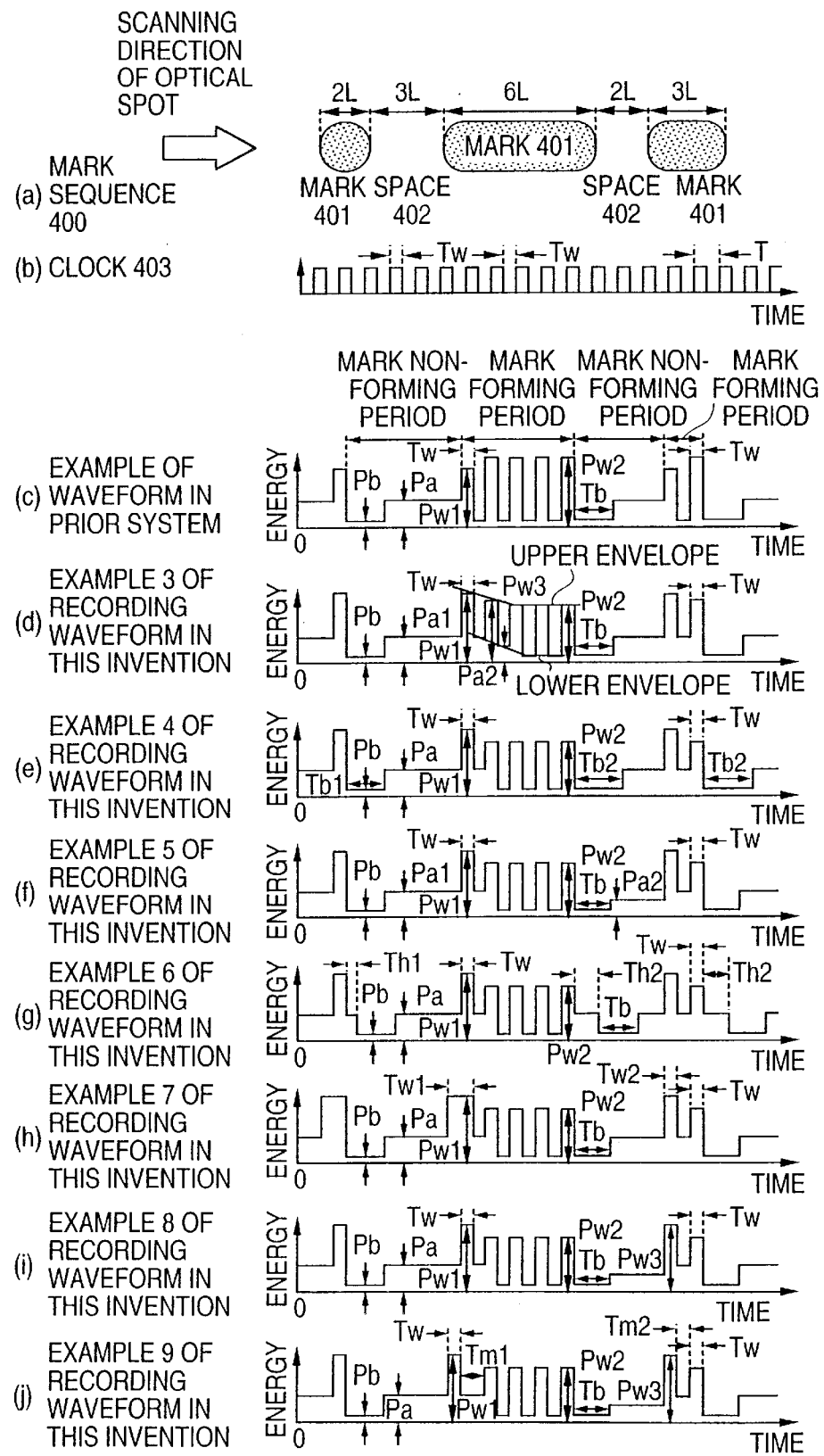
FIG. 4 is a diagram illustrating the operation of a recording pattern analyzer of the invention.
Figure 5:
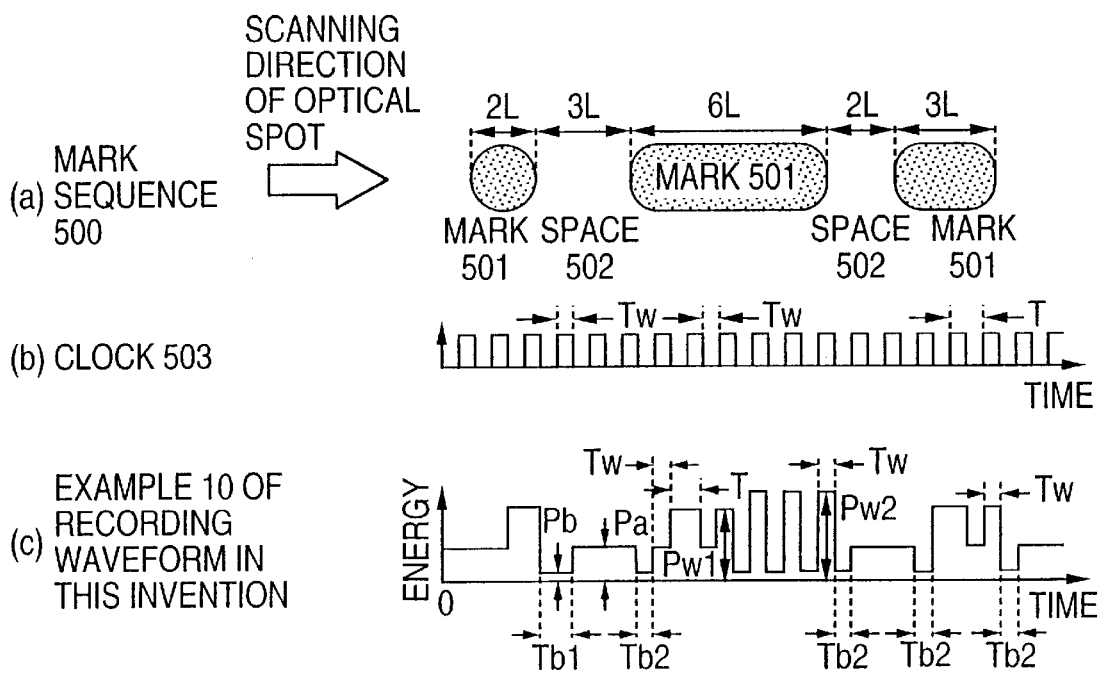
FIG. 5 is a diagram illustrating the operation of the recording pattern analyzer of the invention.
Figure 6:
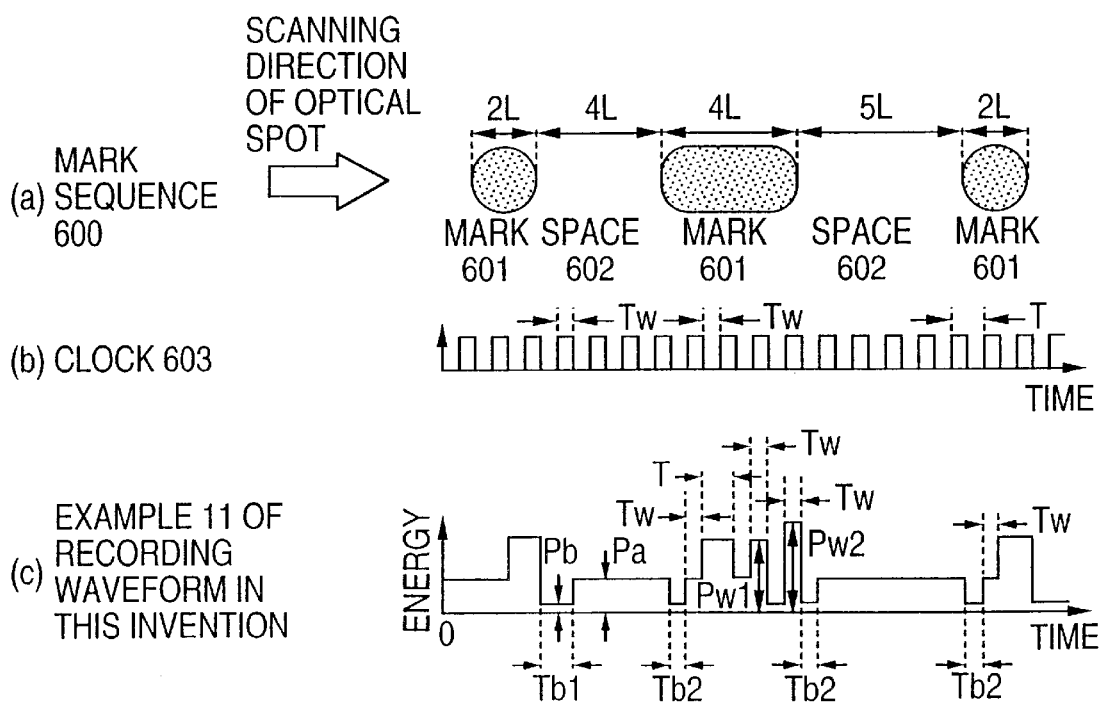
FIG. 6 is a diagram illustrating the operation of the recording pattern analyzer of the invention.

FIG. 4 at (a) to (j) and FIGS. 5 and 6 show mark sequences and their waveforms illustrating the operation of the recording pattern analyzer 302 shown in FIG. 2. FIG. 4 at (a), FIG. 5 at (a) and FIG. 6 at (a) show images of mark sequences to be formed on a recording medium and corresponding to channel data sequences. L is the minimum unit (channel bit length) of a change amount of a length of each of marks 401, 501 and 601 and spaces 402, 502 and 602. A recording/reproducing laser light spot scans from the left to right in FIGS. 4 to 6 at (a). A target edge interval of the marks 401, 501 and 601 and spaces 402, 502 and 602 is always an integer multiple of L.

FIG. 4 at (b) shows a reference timing signal which is a clock signal of a period T for controlling the recording block. Signals including the recording waveform of the recording block are generated and transferred synchronously with this clock signal. T corresponds to a time duration of the detection window corresponding to the channel bit length L, and has a relationship of $L=vT$ where v is a motion speed of a laser light spot. The clock signal is a rectangular wave with a duty ratio of 50%, the high and low level periods each being equal to Tw. In this embodiment, there is a relationship of $T=2Tw$, and the energy level holding period to be described below is an integer multiple of Tw, i.e., an integer multiple or a half-odd integer multiple of the period T of the reference timing signal.

FIG. 4 at (c) is a diagram showing an example of a recording waveform used by a conventional information recording apparatus. The recording waveform is mainly classified into a mark forming period and a mark non-forming period. In the mark forming period, high level energy necessary for the formation of a mark is intermittently irradiated, and the mark non-forming period is the period other than the mark forming period and corresponds to a space. In the mark forming period, any one or ones of energy levels Pa, Pb, Pw1 and Pw2 are generated, and in the mark non-forming period, energy levels Pb and Pa are consecutively generated. In this recording waveform, fixed energy levels are sequentially generated in a fixed order irrespective of an immediately preceding mark or space length, i.e., irrespective of a preceding recording pattern, only by reflecting a corresponding mark length or space length. More specifically, the mark forming period corresponding to the mark of 2L is constituted of a single pulse having a width Tw and a level Pw1. As the mark length is elongated at an increment of L, a pulse having a width Tw and a level Pw2 is added at a repetition period of T. The level between the levels Pw1 and Pw2 is always Pb. In the mark non-forming period, a low level period with a width Tb (=3Tw) and the level Pb is provided as the start period, and the Pa level is maintained to the succeeding mark forming period.

FIG. 4 at (d) is a diagram showing an example of a recording waveform used by an information recording apparatus of this invention. In the mark forming period, energy levels are sequentially output in the order of first Pw1, Pa1, Pw3, Pa2, Pw2 and Pb, and then repetitions of Pw2 and Pb. The upper and lower envelopes of the recording waveform lower as the time lapses after the start of the mark forming period. The holding time of each level is equal to Tw. In the mark non-forming period, a level Pb period is provided by Tb (=3Tw) as the start level period and thereafter the level Pa is maintained to the succeeding mark forming period.

FIG. 4 at (e) is a diagram showing another example of a recording waveform used by the information recording apparatus of this invention. In the mark forming period, the upper and lower envelopes of the recording waveform lower as the time lapses after the start of the mark forming period. The holding time of each level is equal to Tw. In the mark non-forming period, the recording waveform is adaptatively changed with a preceding recording pattern, i.e., immediately preceding mark length. More specifically, the mark forming period corresponding to the mark of 2L is constituted of a single pulse having a width Tw and a level Pw1. As the mark length is elongated at an increment of L, a pulse having a width Tw and a level Pw2 is added at a repetition period of T. The level between the levels Pw1 and Pw2 is Pa, and the level between level Pw2 pulses is Pb. In the mark non-forming period, a level Pb period is provided as the start period, and the Pa level is maintained to the succeeding mark forming period. The level Pb period adaptatively changes to Tb1 (=3Tw) if the preceding mark length is 2L, and to Tb2 (=4Tw) if the preceding mark length is 3L or longer. In this example, for the simplicity purpose, the energy levels forming the upper envelope during the mark forming period are two levels and the energy levels forming the lower envelope are two levels. The number of energy levels is not intended to be limitative. For example, as shown in FIG. 4 at (d), three levels or more may be used for forming the upper and lower envelopes. This may also be applied to other examples shown in FIG. 4 at (f) to (j) to follow.

FIG. 4 at (f) is a diagram showing another example of a recording waveform used by the information recording apparatus of this invention. In the mark forming period, the upper and lower envelopes of the recording waveform lower as the time lapses after the start of the mark forming period. The holding time of each level is equal to Tw. In the mark non-forming period, this recording waveform is adaptatively changed with a preceding recording pattern, i.e., immediately preceding mark length. More specifically, the mark forming period corresponding to the mark of 2L is constituted of a single pulse having a width Tw and a level Pw1. As the mark length is elongated at an increment of L, a pulse having a width Tw and a level Pw2 is added at a repetition period of T. The level between the levels Pw1 and Pw2 is Pa, and the level between level Pw2 pulses is Pb. In the mark non-forming period, a level Pb period is provided by Tb (=3Tw) as the start period, and the Pa1 or Pa2 level is maintained to the succeeding mark forming period. The levels Pa1 and Pa2 are adaptatively set to Pa1 if the preceding mark length is 2L, and to Pa2 if it is 3L or longer.

FIG. 4 at (g) is a diagram showing another example of a recording waveform used by the information recording apparatus of this invention. In the mark forming period, the upper and lower envelopes of the recording waveform lower as the time lapses after the start of the mark forming period. The holding time of each level is equal to Tw. In the mark non-forming period, this recording waveform is adaptatively changed with a preceding recording pattern, i.e., immediately preceding mark length. More specifically, the mark forming period corresponding to the mark of 2L is constituted of a single pulse having a width Tw and a level Pw1. As the mark length is elongated at an increment of L, a pulse having a width Tw and a level Pw2 is added at a repetition period of T. The level between the levels Pw1 and Pw2 is Pa, and the level between level Pw2 pulses is Pb. In the mark non-forming period, a level Pa period is provided by Th1 (=Tw) or Th2 (=2Tw) as the start period, a level Pb period is thereafter provided by Tb (=3Tw), and the level Pa is maintained to the succeeding mark forming period. The periods Th1 and Th2 are adaptatively set to Th1 if the preceding mark length is 2L, and to Th2 if it is 3L or longer.

FIG. 4 at (h) is a diagram showing another example of a recording waveform used by the information recording apparatus of this invention. In the mark forming period, the upper and lower envelopes of the recording waveform lower as the time lapses after the start of the mark forming period. In the mark forming period, the start recording waveform is adaptatively changed with a preceding recording pattern, i.e., immediately preceding mark length. More specifically, the mark forming period corresponding to the mark of 2L is constituted of a single pulse having a width Tw1 (=2Tw) or Tw2 (=Tw) and a level Pw1. As the mark length is elongated at an increment of L, a pulse having a width Tw and a level Pw2 is added at a repetition period of T. The period of the level Pw1 adaptatively changes to Tw1 if the preceding mark length is 2L, and to Tw2 if it is 3L or longer. The level between the levels Pw1 and Pw2 is Pa, and the level between level Pw2 pulses is Pb. In the mark non-forming period, a level Pb period is provided by Tb (=3Tw), and the level Pa is maintained to the succeeding mark forming period.

FIG. 4 at (i) is a diagram showing another example of a recording waveform used by the information recording apparatus of this invention. In the mark forming period, the upper and lower envelopes of the recording waveform lower as the time lapses after the start of the mark forming period. The holding time of each level is equal to Tw. In the mark forming period, the start recording waveform is adaptatively changed with a preceding recording pattern, i.e., immediately preceding mark length. More specifically, the mark forming period corresponding to the mark of 2L is constituted of a single pulse having a width Tw and a level Pw1 or Pw3. As the mark length is elongated at an increment of L, a pulse having a width Tw and a level Pw2 is added at a repetition period of T. The levels Pw1 and Pw3 are adaptatively set to Pw1 if the preceding mark length is 2L, and to Pw3 if it is 3L or longer. The level between the levels Pw1 and Pw2 is Pa, and the level between level Pw2 pulses is Pb. In the mark non-forming period, a level Pb period is provided by Tb (=3Tw), and the level Pa is maintained to the succeeding mark forming period.

FIG. 4 at (j) is a diagram showing another example of a recording waveform used by the information recording apparatus of this invention. In the mark forming period, the upper and lower envelopes of the recording waveform lower as the time lapses after the start of the mark forming period. In the mark forming period, the start recording waveform is adaptatively changed with a preceding recording pattern, i.e., immediately preceding mark length. More specifically, the mark forming period corresponding to the mark of 2L is constituted of a single pulse having a width Tw and a level Pw1 or Pw3. After a period of Tm1 (=2Tw) or Tm2 (=Tw) being provided immediately after this single pulse, as the mark length is elongated at an increment of L, a pulse having a width Tw and a level Pw2 is added at a repetition period of T. The periods Tm1 and Tm2 are adaptatively set to Tm1 if the preceding mark length is 2L, and to Tm2 if it is 3L or longer. The level between the levels Pw1 and Pw2 is Pa, and the level between level Pw2 pulses is Pb. In the mark non-forming period, a level Pb period is provided by Tb (=3Tw), and the level Pa is maintained to the succeeding mark forming period.

FIG. 5 at (c) is a diagram showing another example of a recording waveform used by the information recording apparatus of this invention. In the mark forming period, the lower envelope of the recording waveform lowers as the time lapses after the start of the mark forming period. In the mark non-forming period, the recording waveform is adaptatively changed with its own space length. More specifically, the mark non-forming period corresponding to the space of 2L is constituted of a level Pa period with a width of 4Tw and level Pb periods with a width Tw provided before and after the level Pa period. After the mark non-forming period corresponding to the space of 3L or longer being constituted of a start level Pb period with a width Tb1 (=2Tw) and a level Pa period with a width Th (=Tw) followed by a level Pb period with the width Tb2 (=Tw), as the space length is elongated at an increment of L, the level Pa period with the level Pb periods provided before and after the level Pa period is elongated by L. The mark forming period corresponding to the mark of 2L is constituted of a single pulse having a width Tw and a level Pw1. The mark forming period corresponding to the mark of 3L is constituted of a level Pw1 period with the width Tw followed by a level Pa period with the width Tw and a level Pw1 period with the width Tw. Thereafter, as the mark length is elongated at an increment of L, a level Pw2 pulse with the width Tw is added with a level Pb period with the width Tw being provided before the level Pw2 pulse.

FIG. 6 at (c) is a diagram showing another example of a recording waveform used by the information recording apparatus of this invention. In the mark forming period, the lower envelope of the recording waveform lowers as the time lapses after the start of the mark forming period. In the mark non-forming period, the recording waveform is adaptatively changed with its own space length. More specifically, the mark non-forming period corresponding to the space of 4L or shorter is constituted of a start level Pb period with a width Tb1 (=2Tw) and a level-Pa period with a width Th (=Tw) followed a level Pb period with the width Tb2 (=Tw). After the mark non-forming period corresponding to the space of 5L or longer being constituted of the start level Pb period with a width Tb2 (=Tw) and a level Pa period with a width Th (=Tw) followed the level Pb period with the width Tb2 (=Tw), as the space length is elongated at an increment of L, the level Pa period with the level Pb periods provided before and after the level Pa period is elongated by L. The mark forming period corresponding to the mark of 2L is constituted of a single pulse having a width Tw and a level Pw1. The mark forming period corresponding to the mark of 3L is constituted of a level Pw1 period with the width Tw followed by a level Pa period with the width Tw and a level Pw1 period with the width Tw. Thereafter, as the mark length is elongated at an increment of L, a level Pw2 pulse with the width Tw is added with a level Pb period with the width Tw being provided before the level Pw2 pulse.

Figure 7:
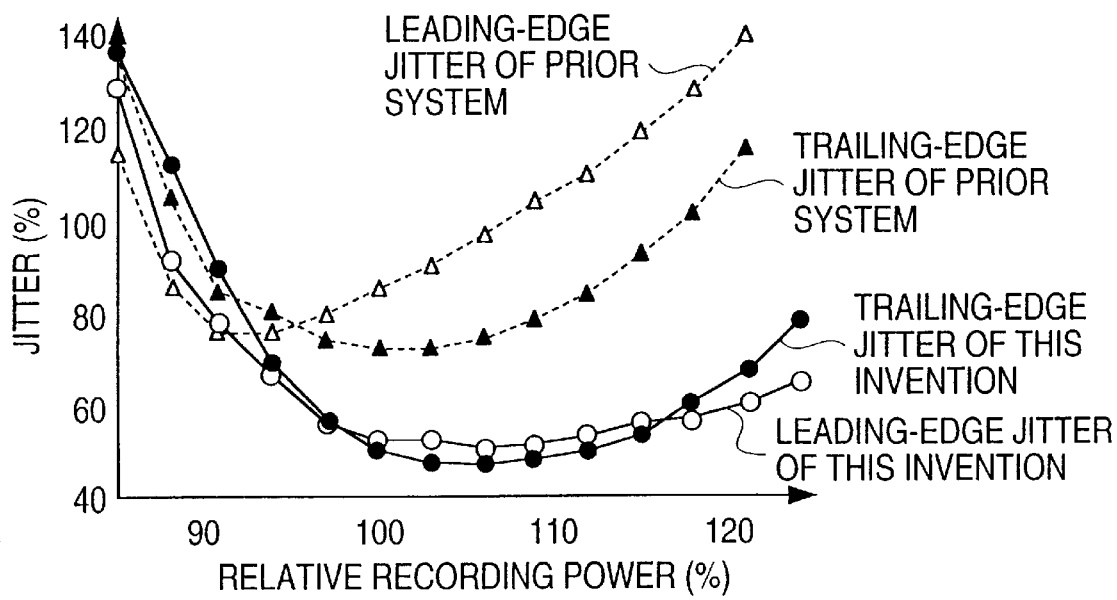
FIG. 7 is a diagram illustrating the effects of high precision mark formation of the invention.

FIG. 7 is a graph showing a relationship between a relative recording power and a jitter, the relationship being obtained through mark edge recording using recording waveforms of the invention apparatus and a conventional apparatus. The measurement conditions were as follows. The modulation rule of the encoder used (1,7) codes, an optical system had a light source wave-length of 685 nm, an objective lens has a numerical aperture of 0.55, and the linear recording density was 0.40 $\mu$m/bit. An open symbolled broken line indicates a jitter (ratio to detection window width) obtained by measuring the interval of leading edges by using conventional recording waveforms, whereas a solid symbolled broken line indicates a jitter (ratio to detection window width) obtained by measuring the interval of trailing edges by using conventional recording waveforms. With conventional recording waveforms, the position of the leading edge of a mark shifts from the ideal position by the influence of the preceding recording pattern. Therefore, the leading edge jitter becomes as a whole larger than the trailing edge jitter. A power which optimizes the leading edge is different from a power which optimizes the trailing edge. In contrast, an open symbolled solid line indicates a jitter (ratio to detection window width) obtained by measuring the interval of leading edges by using recording waveforms of the invention, whereas a solid symbolled solid line indicates a jitter (ratio to detection window width) obtained by measuring the interval of trailing edges by using recording waveforms of the invention. With recording waveforms of the invention, the leading edge of the mark is formed generally at an ideal position so that the jitter can be improved as a whole. A power which optimizes the leading edge is the same as a power which optimizes the trailing edge. Furthermore, the levels of jitters of the leading and trailing edges are generally equal and the recording power margin is considerably improved.

According to the present invention, marks can be formed at a high precision by an information recording apparatus of the type which records data by applying energy to a recording medium to form thereon local physical changes of the medium. It is therefore possible to adopt a mark edge recording method which is suitable for high linear recording density. Furthermore, by realizing a constant heat accumulation, a reproduction crosstalk can be made constant and the track interval can be shortened. Accordingly, the recording area density can be improved. Since the recording/reproducing operation can be stabilized greatly and at the same time the information recording apparatus and recording media can be made compact, the manufacture cost can be reduced.

What is claimed is:

1. An information recording apparatus for recording data by applying energy to a recording medium to form thereon local physical changes of the medium, the information recording apparatus comprising:

total energy irradiating amount discriminating means for discriminating a total energy irradiating amount of each mark when data is recorded; and recording energy irradiating means for switching between at least two levels of the total energy irradiating amount during a mark non-forming period, in accordance with results discriminated by the total energy irradiating amount discriminating means.

2. An information recording apparatus according to claim 1, wherein the at least two levels are at least two mutually different levels.

3. An information recording apparatus for recording data by applying energy to a recording medium to form thereon local physical changes of the medium, the information recording apparatus comprising:

total energy irradiating amount discriminating means for discriminating a total energy irradiating amount of each space when data is recorded; and recording energy irradiating means for switching between at least two levels of the total energy irradiating amount during a mark non-forming period, in accordance with results discriminated by the total energy irradiating amount discriminating means.

4. An information recording apparatus according to claim 3, wherein the at least two levels are at least two mutually different levels.

* * * * *